United States Patent [19]

Kobayashi et al.

[11] Patent Number: 4,656,105

[45] Date of Patent: Apr. 7, 1987

[54] IODINE CELL

[75] Inventors: Sadao Kobayashi; Hiroshi Sukawa; Sadaaki Yamamoto, all of Yokohama, Japan

[73] Assignee: Mitsuit Toatsu Chemicals, Inc., Tokyo, Japan

[21] Appl. No.: 726,907

[22] PCT Filed: Aug. 30, 1984

[86] PCT No.: PCT/JP84/00416
§ 371 Date: Apr. 17, 1985
§ 102(e) Date: Apr. 17, 1985

[87] PCT Pub. No.: WO85/01155
PCT Pub. Date: Mar. 14, 1985

[30] Foreign Application Priority Data

Aug. 30, 1983 [JP] Japan .................. 58-157142
Aug. 30, 1983 [JP] Japan .................. 58-157143
Sep. 20, 1983 [JP] Japan .................. 58-172250
Jan. 5, 1984 [JP] Japan ........................ 59-76
Jan. 5, 1984 [JP] Japan ........................ 59-77

[51] Int. Cl.⁴ ......................................... H01M 10/36
[52] U.S. Cl. ................... 429/192; 429/213; 429/232
[58] Field of Search ............... 429/191, 213, 192, 194, 429/232

[56] References Cited

U.S. PATENT DOCUMENTS

| 3,438,813 | 4/1969 | Davis | 429/213 |
| 3,660,163 | 5/1972 | Moser | 429/191 |
| 3,660,164 | 5/1972 | Hermann et al. | 429/191 |
| 3,773,557 | 11/1973 | Mead | 429/192 |
| 4,060,673 | 11/1977 | Dey | 429/192 |
| 4,550,064 | 10/1985 | Yen et al. | 429/194 |

FOREIGN PATENT DOCUMENTS 49-34086 6/1974 Japan .
53-120138 10/1978 Japan .
56-42961 4/1981 Japan .

Primary Examiner—Donald L. Walton
Attorney, Agent, or Firm—Fisher, Christen & Sabol

[57] ABSTRACT

This invention provides an iodine cell in which a composition obtained by including a carbon such as carbon black and graphite in dispersed form in a composition comprising iodine and a polymer having the ability to form a complex adduct with it, said polymer fixing iodine, is used as a positive electrode material and preferably a cation exchange membrane is used as a separator. The iodine cell is characterized by having a high output, a low internal resistance, a high charging-discharging life (a large cycle number) and a long service life and being able to be charged even when almost all of iodine has been liberated from the positive electrode. It can be used suitably as a primary cell, preferably as a secondary cell.

9 Claims, 1 Drawing Figure

IODINE CELL

[FIELD OF TECHNOLOGY]

This invention relates to an iodine cell which uses iodine fixed by a polymer as a positive electrode active substance.

[BACKGROUND TECHNOLOGY]

Iodine is a substance which readily becomes an anion, and is one of suitable positive electrode active substances. Iodine is known to form charge transfer complexes with various organic compounds. The charge transfer complexes of iodine are composed of iodine (acceptor) and various electron donating organic compounds (organic donor component). Known electron-donating compounds include heterocyclic compounds such as phenothiazine and carbazole; polynuclear aromatic compounds such as pyrene and perylene; and organic polymers such as poly-2-vinylpyridine, polyacetylene, poly-p-phenylene, polythienylene, polypyrrole, polyaniline, polyamides, polyvinyl alcohol, polyethylene, polypropylene and polystyrene.

Some cells are known in which such an iodine charge transfer complex (to be referred to as the iodine complex or simply the complex adduct) is used as a main component of a positive electrode material. Furthermore, the present inventors found that such organic polymers as urea-formaldehyde resin, polyurethane, polyacrylonitrile, polyacrylamide, polymethacrylamide, polyethers and melamine resins are effective as the organic donor component.

However, the cells which use such iodine complexes as positive electrode active substances have problems. They have a low output. As discharging proceeds, they lose iodine, and abruptly decrease in electrical conductivity. Consequently, the resistance of the positive electrode material increases very much, and the internal resistances of the cells increase remarkably.

When a positive electrode material composed of the iodine complex is used in a secondary cell, discharging causes most of iodine to come off from the positive electrode material. Hence, this constitutes a decisive defect in secondary cells, i.e. the defect that the positive electrode material usually becomes an insulator and makes it impossible to recharge the cells. This problem inevitably arises when using iodine complexes of polymers which are intrinsically insulators, such as polyamides, polyacrylonitrile, polyvinyl alcohol, polyethers and poly-2-vinylpyridine.

Furthermore, such cells have the defect of short service lives.

Figure 1:
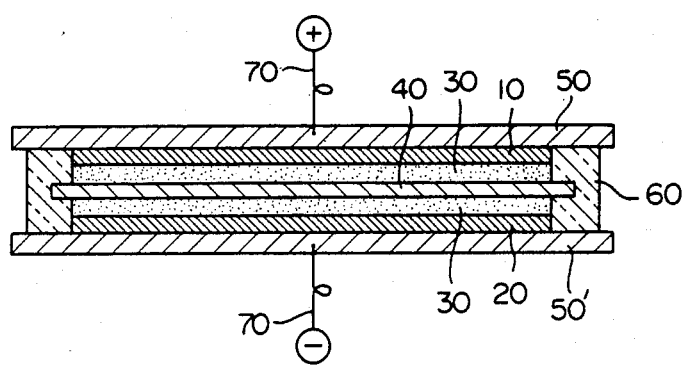
FIG. 1 is a sectional view showing a preferred embodiment of the cell of this invention.

In the drawing, 10 represents a positive electrode; 20, a negative electrode; 30, an electrolyte; 40, a separator; 50 and 50', a support; 60, a packing; and 70, a lead wire.

[DISCLOSURE OF THE INVENTION]

According to this invention, there is provided a cell in which a complex adduct of iodine and a polymer having the ability to form a complex adduct with iodine and/or a composition comprising said polymer and iodine dispersed therein is used as a main component of a positive electrode material, said positive electrode material having a carbon dispersed therein.

As preferred polymers having the ability to form a complex adduct with iodine in this invention, there can, for example, be named polyacrylamide, polymethacrylamide, urea-formaldehyde resin, polyvinyl alcohol, polyvinyl acetate, aliphatic polyamides such as nylon-6, nylon-6,6, nylon-12, nylon-6,9 and nylon-6,10, wholly aromatic polyamides such as Kelvar (a trademark for a product of E. I. du Pont de Nemours and Co.), polyethylene, polypropylene, polystyrene, polyurethane, melamine resin, polyethers, polyacrylonitrile, Barex resin, polymethyl methacrylate, polytetramethylene ether, polyvinylpyrrolidone, poly-4-vinylpyridine, poly-2-vinylpyridine and poly-N-vinylcarbazole. The other known polymers described hereinabove can of course be used.

Two or more of these may be used as a blend, or a copolymer thereof may also be used.

In the cell of this invention, a carbon is included in a dispersed form in a positive electrode material composed of iodine and the polymer having the ability to form a complex adduct with iodine. A general method of preparing it is, for example, as follows:

First, a carbon is added to a predetermined amount of the polymer having the ability to form a complex adduct with iodine to include it in a dispersed form. Preferably, the method of adding the carbon is to first prepare a polymer/carbon mixture. This may be accomplished, for example, by a method which comprises dissolving the polymer in a solvent, mixing the carbon with the solution and thereafter removing the solvent, or a method which comprises kneading the carbon directly with the polymer and dispersing it therein. Iodine is added to the resulting polymer/carbon mixture. Iodine may be ordinary solid or flaky iodine either as such or as required, in purified form. Iodine may be added, for example, by (i) a method comprising bringing a vapor of iodine into contact with the polymer/carbon mixture to effect addition and adsorption, (ii) a method comprising immersing the polymer/carbon mixture in a solution of iodine in benzene, acetone, etc. to effect addition and adsorption of iodine, or (iii) a method comprising kneading iodine into the polymer/carbon mixture. Instead of first preparing the polymer/carbon mixture, there may also be used a method which comprises adding the carbon and iodine simultaneously to a predetermined amount of the polymer and kneading them in the molten state to disperse the carbon and to prepare the positive electrode material in one step. In this case, there is no particular restriction on the order of addition or mixing of substances to be added for kneading.

In short, it suffices if there can be prepared a composition (positive electrode material) in which the carbon is dispersed substantially in the complex adduct of the polymer and iodine and/or a composition comprising the polymer and iodine dispersed therein, and there is no particular restriction on the method of its preparation. Of course, the methods of preparation include one in which a current collector is incorporated in the positive electrode composition in order to take out electric current rapidly from the positive electrode material.

As the current collector, there can be used, for example, a mesh of a metal nobler than the metals used as a negative electrode such as platinum or stainless steel, a mat, cloth or porous block of carbon.

Examples of the carbon to be added to the positive electrode material in the cell of this invention include carbon black, acetylene black, graphite, and Ketjen Black (a trademark of AKZO Chemie). Preferably, they are in an easily dispersible form such as a powder, scales and short fibers. The amount of the carbon differs, of course, with its type. Usually, it is 0.5 to 60% (% by weight; the same basis applies hereinafter) based on the total weight of polymer and carbon. It is 0.5 to 50% for Ketjen Black, and 0.5 to 40% for pulverized graphite. If the amount of the carbon is less than the specified limit, the effect of addition is little, and the electrical conductivity decreases abruptly if the iodine content is low. When the carbon is used in amounts exceeding the above-specified limit, the effect does not further increase, and rather the moldability of the resulting composition is reduced. The amount of Ketjen Black is preferably 5 to 40%, especially preferably 10 to 30%.

The cell of this invention may be formed by using as a positive electrode a composition containing the resulting complex adduct of iodine and the polymer having the ability to form the complex adduct with iodine and/or a composition comprising said polymer and iodine dispersed therein as a main ingredient and a metal such as lithium, zinc, cadmium, magnesium or aluminum as a negative electrode, and contacting them with each other.

In the cell of this invention, most of iodine forms a complex adduct in the polymer. Of course, it is not necessary for all of iodine to exist as the complex adduct. Iodine may partly or wholly be simply dispersed in free form in the polymer. In short, it is sufficient that iodine is substantially taken up in the polymer. In ordinary cells, the positive electrode and the negative electrode are contacted usually through an electrolyte. The cell of the present invention is characterized by not always requiring such an electrolyte. This is presumably because in the interface at which the two electrodes contact each other, the resulting metal iodide itself constitutes an electrolyte. In applications which do not require so high an output, for example, in a cardiac pacemaker, the cell of the invention as such is sufficiently feasible. It is also possible to use a solid electrolyte such as lithium iodide and lead iodide from the outset.

In the case of a secondary cell (storage cell) of the wet type, namely having an electrolyte solution, the positive electrode and the negative electrode may be contacted with each other through an electrolyte solution of a metal iodide which is the discharge product corresponding to the metal of the negative electrode (for example, zinc iodide when the negative electrode is zinc).

Of course, besides the metal iodide electrolyte formed by discharging as stated above, a solution of such an electrolyte as ammonium chloride, sodium chloride, zinc chloride, sodium bromide, potassium bromide, lithium iodide or zinc iodide may be used as an auxiliary electrolyte. Preferably, to prevent self-discharging, a porous separator is inserted between the two active substances in the electrolyte solution.

The method of forming the storage cell of this invention is described below more specifically. An electrode formed by integrating the resulting composition of the polymer, carbon and iodine and the current collector is used as a positive electrode, and the metal described above in regard to the formation of the cell is used as a negative electrode. They are assembled together with a metal iodide corresponding to the metal of the negative electrode (for example, zinc iodide when the negative electrode is zinc) as an electrolyte. Of course, as required, the auxiliary electrolyte may be used in place of the metal iodide, or the auxiliary electrolyte may be added to the metal iodide. Usually, such an electrolyte is used as a solution in water. In some cases, for example when a metal which vigorously reacts with water, such as lithium and sodium, is used as the negative electrode, it is desirable to use a solvent having low reactivity, such as propylene carbonate or gamma-butyrolactone. Preferably, the metal iodide dissolved in such a solvent is impregnated in a porous support having the ability to hold a large amount of liquid such as a glass fiber mat (filter paper is also feasible). The porous material impregnated with the electrolyte has the advantage that a storge cell can be built by interposing it directly between the aforesaid positive and negative electrodes.

By discharging the storage cell formed as above, a metal ion is formed at the negative electrode and an iodine ion, at the positive electrode. These ions are combined to form a metal iodide which is an electrolyte (discharge product). During charging, the metal iodide is decomposed into the metal and iodine. The metal precipitates at the negative electrode, and iodine is again taken up into the positive electrode containing the polymer as a main component. As a result, the cell again attains a charged condition.

Specifically, when a dc voltage is applied to the storage cell of this invention at the time of charging so as to deposit iodine at the positive electrode and the metal at the negative electrode, iodine deposited at the positive electrode readily forms a complex adduct with the polymer as a main component of the positive electrode and is taken into the polymer. After charging, the dc voltage is cut off and the terminals of the two electrodes are connected through a load whereby discharging occurs and power is obtained at the load.

The cell of this invention is characterized by the fact that the complex adduct of iodine and a specific polymer and/or a composition comprising the polymer and iodine dispersed therein is used as a main component of the positive electrode material, and a carbon is included in the composition in a dispersed form. The technical significance of dispersing the carbon is as follows:

It has previously been known as stated above that the complex adduct of iodine and a certain type of polymer is a material having much better electric conductivity than the individual components. For example, a complex of iodine with poly-2-vinylpyridine is used as a positive electrode material of a primary cell for cardiac pacemakers. However, such a complex adduct has the defect that as discharging is carried out, it loses iodine and abruptly decreases in electrical conductivity and that the interior resistance of a cell using it increases remarkably. Particularly, when this complex adduct is used as a positive electrode material of a secondary cell, the amount of iodine in the positive electrode material becomes very small as a result of discharging. Attempts to charge this cell after the end of discharging fail because the electric conductivity of the electrode is completely lost as described above. In other words, such a complex adduct cannot at all be utilized in a secondary cell in particular.

In the cell of this invention, however, by dispersing the carbon in the positive electrode material comprising the complex adduct as a main ingredient, the electrical conductivity of the composition can be greatly increased. In addition, the invention can exhibit the marked advantage that even when discharging proceeds, a large electric current can be obtained without an appreciable increase in the internal resistance of the positive electrode.

Unexpectedly, the addition of the carbon to the positive electrode material sometimes even increases the electrical conductivity of the positive electrode material by discharging.

As stated above, the addition of the carbon to the positive electrode material in accordance with this invention is essential to the complex cell of this invention.

In a more preferred embodiment of this invention, a cation exchange membrane is inserted in an electrolyte solution instead of the conventional porous separator. By so doing, the service life of the cell can be greatly prolonged as compared with the case of using the conventional separator. This is presumably because the use of the cation exchange membrane as a separator can effectively prevent self-discharging which is considered to occur by the reaction of the negative electrode metal with an $I_3$ anion produced by the reaction of iodine ($I_2$) as a positive electrode active substance fixed as a complex and the metal iodide (MIn) in the electrolyte solution.

The cation exchange membrane used as the separator in the cell of this invention may be an inorganic membrane or an organic membrane. Ion exchange membranes of the hydrocarbon type and ion exchange membrane of the fluorocarbon type among the organic membranes are particularly preferred.

As a matter of course, cation exchange membranes permit selective permeation of cations alone. The cation exchange membrane used in the cell of this invention may contain any of sulfonic, carboxylic and phosphoric acid groups as an ion exchange group.

Usually, the membrane is properly surface-treated in order to reduce its electrical resistance, and reinforced with a cloth or net in order to increase its mechanical strength.

The cation exchange membrane that can be used in the cell of this invention may be any commercially available membrane which satisfies the above requirements. For example, there are a Selemion cation exchange membrane CMV (a product of Asahi Glass Co., Ltd.) and a cation exchange membrane CM (a product of Toyo Kagaku Sangyo K. K.) which are of the hydrocarbon type, and a Nafion 324 cation exchange membrane (a product of E. I. du Pont de Nemours & Co.) which is of the fluorocarbon type. Any cation exchange membranes which permit selective permeation of cations and selectively hamper permeation of anions may be used, and the above-exemplified membranes are not particularly limitative. Of course, preferred cation exchange membranes have low electrical resistance and high mechanical strength and exhibit strong corrosion resistance in oxidizing and reducing atmospheres.

[BEST MODE OF PRACTICING THE INVENTION]

EXAMPLE 1

A cell having the structure shown in FIG. 1 was built by the following procedure.

Sixty milligrams of Ketjen Black KB-EC (a trademark of AKZO Chemie) was added to, and well dispersed, in DMF containing 300 mg of polyacrylonitrile (average molecular weight 152,000). The dispersion was coated on a carbon fiber disc (E-715 made by Kureha Chemical Industry Co., Ltd.) having a diameter of 4.5 cm, and DMF was removed by spontaneous evaporation. The disc was immersed in an acetone solution of iodine to effect addition of 380 mg of iodine. The product was used as positive electrode 10. A 0.3 mm-thick zinc plate (a product of Mitsui Mining & Smelting Co., Ltd.) was used as negative electrode 20. A 1 mole/liter aqueous solution of $NH_4Cl$ was used as an electrolyte solution and 2 ml of it was impregnated into two glass fiber filters 30, and a Selemion CMV membrane made by Asahi Glass Co., Ltd. was interposed as a separator 40 between the glass fiber filters. The assembly was put between the two electrodes to build a cell. In FIG. 1, 50 and 50' represent a support; 60, a packing; and 70, a lead wire.

The following experiment was conducted at 25° C. in a stream of nitrogen. The initial short-circuit current ($I_{sc}$) of the cell during discharging was measured and found to be 80 mA/cm$^2$. The open-circuit voltage at this time was 1.36 V. At a fixed current of 2 mA, the cell was discharged to a final voltage of 0.9 V and then charged to a final voltage of 1.5 V. This charging-discharging test was repeated. Even after 600 cycles, the test proceeded without an appreciable change in energy efficiency and current efficiency. The electrical capacity after 600 cycles was 87% based on the initial capacity. This shows that the cell is substantially on a practical level as a secondary cell.

For comparison, a cell was built by the same procedure as above except that a positive electrode material not containing Ketjen Black KB-EC was used. The cell was evaluated under the same conditions as above. At the time of discharging, the initial short-circuit current ($I_{sc}$) of this cell was found to be 8 mA/cm$^2$, and at this time, its open-circuit voltage was 1.34 V. The cell was subjected to the charging-discharging test. After discharging, an attempt was made to charge the cell. But the voltage rose remarkably and the cell could not be charged.

EXAMPLE 2

1.0 g of a mixture of 2,4-tolylene diisocyanate and 2,6-tolylene diisocyanate (TDI-80/20, a product of Mitsui-Nisso Urethane Co., Ltd.) was well mixed with 0.9 g of tripropylene glycol containing 200 mg of Ketjen Black KB-EC to prepare a polyurethane resin composition. Three hundred milligrams of the resulting polyurethane resin composition was dissolved in phenol. The solution was coated on a carbon fiber disc (E-715, a product of Kureha Chemical Industry Co., Ltd.) having a diameter of 4.5 cm, and phenol was removed by evaporation. The disc was immersed in an acetone solution of iodine to effect addition of 120 mg of iodine, and the product was used as a positive electrode. A 0.3 mm-thick zinc plate (made by Mitsui Mining & Smelting Co., Ltd.) was used as a negative electrode. A 1 mole/liter aqueous solution of $NH_4Cl$ was used as an electrolyte solution and 2 ml of it was impregnated into two glass fiber filters. A Selemion CMV membrane made by Asahi Glass Co., Ltd. was interposed as a separator between the two glass fiber filters. The assembly was put between the two electrodes to construct a cell. The structure of the cell was that shown in FIG. 1 as in Example 1.

The following experiment was conducted at 25° C. in a stream of nitrogen. The initial short-circuit current ($I_{sc}$) of the cell during discharging was measured and found to be 42 mA/cm$^2$. The open-circuit voltage at this time was 1.36 V. At a fixed current of 2 mA, the cell was discharged to a final voltage of 0.9 V and then charged to a final voltage of 1.5 V. This charging-discharging test was repeated. Even after 600 cycles, the test proceeded without an appreciable change in energy efficiency and current efficiency. The electrical capacity after 600 cycles was 87% based on the initial capacity. This shows that the cell is substantially on a practical level as a secondary cell.

For comparison, a cell was built by the same procedure as above except that a positive electrode material not containing Ketjen Black KB-EC was used. The cell was evaluated under the same conditions as above. At the time of discharging, the initial short-circuit current ($I_{sc}$) of this cell was found to be 6 mA/cm$^2$, and at this time, its open-circuit voltage was 1.34 V. The cell was subjected to the charging-discharging test. After discharging, an attempt was made to charge the cell. But the voltage rose remarkably and the cell could not be charged.

EXAMPLE 3

Sixty milligrams of Ketjen Black KB-EC (a trademark of AKZO Chemie) was added to, and well dispersed in, a formic acid solution containing 300 mg of nylon-6 (a product of Toray Inc.). The dispersion was coated on a carbon fiber disc (E-715, a product of Kureha Chemical Industry Co., Ltd.) having a diameter of 4.5 cm, and formic acid was removed by spontaneous evaporation. The disc was immersed in an acetone solution of iodine to effect addition of 360 mg of iodine, and the product was used as a positive electrode. A 0.3 mm-thick zinc plate (made by Mitsui Mining & Smelting Co., Ltd.) was used as a negative electrode. A 1 mole/liter aqueous solution of NH$_4$Cl was used as an electrolyte solution and 2 ml of it was impregnated into two glass fiber filters. A Selemion CMV membrane made by Asahi Glass Co., Ltd. was interposed as a separator between the glass fiber filtrs. The assembly was put between the two electrodes to construct a cell. The structure of the cell was that shown in FIG. 1 as in Example 1.

The following experiment was conducted at 25° C. in a stream of nitrogen. The initial short-circuit current ($I_{sc}$) of the cell during discharging was measured and found to be 71 mA/cm$^2$. The open-circuit voltage at this time was 1.36 V. At a fixed current of 2 mA, the cell was discharged to a final voltage of 0.9 V and then charged to a final voltage of 1.5 V. This charging-discharging test was repeated. Even after 600 cycles, the test proceeded without an appreciable change in energy efficiency and current efficiency. The electrical capacity after 600 cycles was 85% based on the initial capacity. This shows that the cell is substantially on a practical level as a secondary cell.

For comparison, a cell was built by the same procedure as above except that a positive electrode material not containing Ketjen Black KB-EC was used. The cell was evaluated under the same conditions as above. At the time of discharging, the initial short-circuit current ($I_{sc}$) of this cell was found to be 10 mA/cm$^2$, and at this time, its open-circuit voltage was 1.34 V. The cell was subjected to the charging-discharging test. After discharging, an attempt was made to charge the cell. But the voltage rose remarkably and the cell could not be charged.

EXAMPLE 4

To 500 mg of U-Loid #320 (a registered trademark of Mitsui Toatsu Chemicals, Inc.), the initial-stage reaction product of a urea resin, were added 50 mg of iodine and 20 mg of Ketjen Black KB-EC (a trademark of AKZO Chemie) as the carbon, and they were well kneaded. Then, one drop of 12N hydrochloric acid as a curing agent was fully mixed with the resulting mixture. The resulting composition was coated on a carbon fiber disc (E-715, a product of Kureha Chemical Industry Co., Ltd.) having a diameter of 4.5 cm and cured, and the product was used as a positive electrode. A 0.3 mm-thick zinc plate (made by Mitsui Mining & Smelting Co., Ltd.) was used as a negative electrode. A 20% aqueous solution of lithium chloride was used as an electrolyte solution and 2 ml of it was impregnated into two glass fiber filter sheets. A Selemion CMV membrane made by Asahi Glass Co., Ltd. was interposed as a separator between two glass fiber filters. The assembly was put between the two electrodes to construct a cell. The structure of the cell was that shown in FIG. 1 as in Example 1.

The following experiment was conducted at 25° C. in a stream of nitrogen. The initial short-circuit current ($I_{sc}$) of the cell during discharging was measured and found to be 35 mA/cm$^2$. The open-circuit voltage at this time was 1.30 V. At a fixed current of 2 mA, the cell was discharged to a final voltage of 0.9 V and then charged to a final voltage of 1.5 V. This charging-discharging test was repeated. Even after 600 cycles, the test proceeded without an appreciable change in energy efficiency and current efficiency. The electrical capacity after 600 cycles was 45% based on the initial capacity. This shows that the cell is substantially on a practical level as a secondary cell.

For comparison, a cell was built by the same procedure as above except that a positive electrode material not containing Ketjen Black KB-EC was used. The cell was evaluated under the same conditions as above. At the time of discharging, the initial short-circuit current ($I_{sc}$) of this cell was found to be 5 mA/cm$^2$, and at this time, its open-circuit voltage was 1.3 V. The cell was subjected to the charging-discharging test. After discharging, an attempt was made to charge the cell. But the voltage rose remarkably and the cell could not be charged.

EXAMPLE 5

300 mg of acrylamide (made by Mitsui Toatsu Chemicals, Inc.) and 1 mg of bismethylene acrylamide were dissolved in 1 ml of fully deoxygenated water, and 3 mg of ammonium persulfate and 1.5 mg of acidic sodium sulfite were added to the solution. The polymerization was carried out to some extent at 20° C. in a stream of nitrogen, and then Ketjen Black KB-EC (a trademark of AKZO Chemie) was added and dispersed by kneading. The mixture was coated on a carbon fiber disc (E-715 made by Kureha Chemical Industry Co., Ltd.) and cured, and the product was used as a positive electrode. A 0.3 mm-thick zinc plate (made by Mitsui Mining & Smelting Co., Ltd.) was used as a negative electrode. A 20% aqueous solution of lithium chloride was used as an electrolyte and 2 ml of it was impregnated into two glass fiber filters. A Selemion CMV membrane made by Asahi Glass Co., Ltd. was interposed as a separator between the two glass fiber filters. The assembly was put between the two electrodes to construct a cell. The structure of the cell was that shown in FIG. 1 as in Example 1.

The following experiment was conducted at 25° C. in a stream of nitrogen. The initial short-circuit current ($I_{sc}$) of the cell during discharging was measured and found to be 46 mA/cm². The open-circuit voltage at this time was 1.3 V. At a fixed current of 2 mA, the cell was discharged to a final voltage of 0.9 V and then charged to a final voltage of 1.5 V. This charging-discharging test was repeated. Even after 600 cycles, the test proceeded without an appreciable change in energy efficiency and current efficiency. The electrical capacity after 600 cycles was 72% based on the initial capacity. This shows that the cell is substantially on a practical level as a secondary cell.

For comparison, a cell was built by the same procedure as above except that a positive electrode material not containing Ketjen Black KB-EC was used. The cell was evaluated under the same conditions as above. At the time of discharging, the initial short-circuit current ($I_{sc}$) of this cell was found to be 6 mA/cm², and at this time, its open-circuit voltage was 1.3 V. The cell was subjected to the charging-discharging test. After discharging, an attempt was made to charge the cell. But the voltage rose remarkably and the cell could not be charged.

EXAMPLE 6

Three hundred milliliters of polytetramethylene ether [having a reduced viscosity, in 0.1% benzene solution, of 1.12; T. Otsu et al., Makromol. Chem., 71, 150 (1964)] was dissolved in ethyl Cellosolve acetate. Sixty milligrams of Ketjen Black KB-EC was added to, and well dispersed in, the solution. The dispersion was coated on a carbon fiber disc (E-715 made by Kureha Chemical Industry Co., Ltd.), and ethyl Cellosolve acetate was removed by evaporation. The disc was then immersed in an acetone solution of iodine to effect addition of 320 mg of iodine, and the product was used as a positive electrode. A 0.3 mm-thick zinc plate (made by Mitsui Mining & Smelting Co., Ltd.) was used as a negative electrode. A 1 mole/liter aqueous solution of $NH_4Cl$ was used as an electrolyte and 2 ml of it was impregnated into two glass fiber filters. A Selemion CMV membrane made by Asahi Glass Co., Ltd. was interposed as a separator between the two glass fiber filters. The assembly was put between the two electrodes to construct a cell. The structure of the cell was that shown in FIG. 1 as in Example 1.

The following experiment was conducted at 25° C. in a stream of nitrogen. The initial short-circuit current ($I_{sc}$) of the cell during discharging was measured and found to be 92 mA/cm². The open-circuit voltage at this time was 1.36 V. At a fixed current of 2 mA, the cell was discharged to a final voltage of 0.9 V and then charged to a final voltage of 1.5 V. This charging-discharging test was repeated. Even after 600 cycles, the test proceeded without an appreciable change in energy efficiency and current efficiency. The electrical capacity after 600 cycles was 88% based on the initial capacity. This shows that the cell is substantially on a practical level as a secondary cell.

For comparison, a cell was built by the same procedure as above except that a positive electrode material not containing Ketjen Black KB-EC was used. The cell was evaluated under the same conditions as above. At the time of discharging, the initial short-circuit current ($I_{sc}$) of this cell was found to be 10 mA/cm², and at this time, its open-circuit voltage was 1.34 V. The cell was subjected to the charging-discharging test. After discharging, an attempt was made to charge the cell. But the voltage rose remarkably and the cell could not be charged.

EXAMPLE 7

Sixty milligrams of Ketjen Black KB-EC (a trademark of AKZO Chemie) was added to, and dispersed well in, a formic acid solution containing 300 mg of Barex Resin (a trademark of The Standard Oil Co. (Ohio), U.S.A. for acrylonitrile, methyl acrylate and butadiene copolymerized graft polymer; sold by Mitsui Toatsu Chemicals, Inc.). The dispersion was coated on a carbon fiber disc (E-715, a product of Kureha Chemical Industry Co., Ltd.) having a diameter of 4.5 cm, and formic acid was removed by evaporation. The disc was immersed in an acetone solution of iodine to effect addition of 380 mg of iodine, and the product was used as a positive electrode. A 0.3 mm-thick zinc plate (made by Mitsui Mining & Smelting Co., Ltd.) was used as a negative electrode. A 1 mole/liter aqueous solution of $NH_4Cl$ was used as an electrolyte solution and 2 ml of it was impregnated into two glass fiber filters. A Selemion CMV membrane made by Asahi Glass Co., Ltd. was interposed as a separator between the two glass fiber filters. The assembly was put between the two electrodes to construct a cell. The structure of the cell was that shown in FIG. 1 as in Example 1.

The following experiment was conducted at 25° C. in a stream of nitrogen. The initial short-circuit current ($I_{sc}$) of the cell during discharging was measured and found to be 70 mA/cm². The open-circuit voltage at this time was 1.35 V. At a fixed current of 2 mA, the cell was discharged to a final voltage of 0.9 V and then charged to a final voltage of 1.5 V. This charging-discharging test was repeated. Even after 600 cycles, the test proceeded without an appreciable change in energy efficiency and current efficiency. The electrical capacity after 600 cycles was 85% based on the initial capacity. This shows that the cell is substantially on a practical level as a secondary cell.

For comparison, a cell was built by the same procedure as above except that a positive electrode material not containing Ketjen Black KB-EC was used. The cell was evaluated under the same conditions as above. At the time of discharging, the initial short-circuit current ($I_{sc}$) of this cell was found to be 7 mA/cm², and at this time, its open-circuit voltage was 1.34 V. The cell was subjected to the charging-discharging test. After discharging, an attempt was made to charge the cell. But the voltage rose remarkably and the cell could not be charged.

EXAMPLE 8

Sixty milligrams of Ketjen Black KB-EC (a trademark of AKZO Chemie) was added to, and dispersed well in, an ethyl acetate solution containing 300 mg of polymethyl methacrylate (average molecular weight 152000). The dispersion was coated on a carbon fiber disc (E-715, a product of Kureha Chemical Industry Co., Ltd.) having a diameter of 4.5 cm, and ethyl acetate was removed by spontaneous evaporation. The disc was immersed in an acetone solution of iodine to effect addition of 220 mg of iodine, and the product was used as a positive electrode. A 0.3 mm-thick zinc plate (made by Mitsui Mining & Smelting Co., Ltd.) was used as a negative electrode. A 1 mole/liter aqueous solution of NH4Cl was used as an electrolyte solution and 2 ml of it was impregnated into two glass fiber filters. A Selemion CMV membrane made by Asahi Glass Co., Ltd. was interposed as a separator between the two glass fiber filters. The assembly was put between the two electrodes to construct a cell. The structure of the cell was that shown in FIG. 1 as in Example 1.

The following experiment was conducted at 25° C. in a stream of nitrogen. The initial short-circuit current ($I_{sc}$) of the cell during discharging was measured and found to be 68 mA/cm$^2$. The open-circuit voltage at this time was 1.36 V. At a fixed current of 2 mA, the cell was discharged to a final voltage of 0.9 V and then charged to a final voltage of 1.5 V. This charging-discharging test was repeated. Even after 600 cycles, the test proceeded without an appreciable change in energy efficiency and current efficiency. The electrical capacity after 600 cycles was 82% based on the initial capacity. This shows that the cell is substantially on a practical level as a secondary cell.

For comparison, a cell was built by the same procedure as above except that a positive electrode material not containing Ketjen Black KB-EC was used. The cell was evaluated under the same conditions as above. At the time of discharging, the initial short-circuit current ($I_{sc}$) of this cell was found to be 7 mA/cm$^2$, and at this time, its open-circuit voltage was 1.34 V. The cell was subjected to the charging-discharging test. After discharging, an attempt was made to charge the cell. But the voltage rose remarkably and the cell could not be charged.

EXAMPLE 9

Polyvinyl alcohol (made by Kuraray Co., Ltd.; 270 mg) and 30 mg of polymelamine resin, Cymel 303 (a trademark of Mitsui Toatsu Chemicals, Inc.) were dissolved in water, and 60 mg of Ketjen Black KB-EC (a trademark of AKZO Chemie) was added to, and well dispersed in, the aqueous solution. The dispersion was coated on a carbon fiber disc (E-715, a product of Kureha Chemical Industry Co., Ltd.) having a diameter of 4.5 cm, and water was removed by spontaneous evaporation. The disc was heat-treated at 150° C. for 40 minutes, and then immersed in an acetone solution of iodine to effect addition of 360 mg of iodine. The product was used as a positive electrode. A 0.3 mm-thick zinc plate (made by Mitsui Mining & Smelting Co., Ltd.) was used as a negative electrode. A 1 mole/liter aqueous solution of NH4Cl was used as an electrolyte solution and 2 ml of it was impregnated into two glass fiber filters. A Selemion CMV membrane made by Asahi Glass Co., Ltd. was interposed as a separator between the two glass fiber filters. The assembly was put between the two electrodes to construct a cell. The structure of the cell was that shown in FIG. 1 as in Example 1.

The following experiment was conducted at 25° C. in a stream of nitrogen. The initial short-circuit current ($I_{sc}$) of the cell during discharging was measured and found to be 300 mA/cm$^2$. The open-circuit voltage at this time was 1.36 V. At a fixed current of 2 mA, the cell was discharged to a final voltage of 0.9 V and then charged to a final voltage of 1.5 V. This charging-discharging test was repeated. Even after 600 cycles, the test proceeded without an appreciable change in energy efficiency and current efficiency. The electrical capacity after 600 cycles was 90% based on the initial capacity. This shows that the cell is substantially on a practical level as a secondary cell.

For comparison, a cell was built by the same procedure as above except that a positive electrode material not containing Ketjen Black KB-EC was used. The cell was evaluated under the same conditions as above. At the time of discharging, the initial short-circuit current ($I_{sc}$) of this cell was found to be 16 mA/cm$^2$, and at this time, its open-circuit voltage was 1.34 V. The cell was subjected to the charging-discharging test. After discharging, an attempt was made to charge the cell. But the voltage rose remarkably and the cell could not be charged.

EXAMPLE 10

Sixty milligrams of Ketjen Black KB-EC (a trademark of AKZO Chemie) was added to, and well dispersed in, a tetrahydrofuran solution containing 300 mg of polyvinyl pyrrolidone (average molecular weight 163000). The dispersion was coated on a carbon fiber disc (E-715 made by Kureha Chemical Industry Co., Ltd.) having a diameter of 4.5 cm, and tetrahydrofuran was removed by spontaneous evaporation. The carbon fiber was immersed in an acetone solution of iodine to effect addition of 420 mg of iodine, and the product was used as a positive electrode. A 0.3 mm-thick zinc plate (made by Mitsui Mining & Smelting Co., Ltd.) was used as a negative electrode. A 1 mole/liter aqueous solution of NH4Cl was used as an electrolyte solution and 2 ml of it was impregnated into two glass fiber filters. A Selemion CMV membrane made by Asahi Glass Co., Ltd. was interposed as a separator between the two glass fiber filters. The assembly was put between the two electrodes to construct a cell. The structure of the cell was that shown in FIG. 1 as in Example 1.

The following experiment was conducted at 25° C. in a stream of nitrogen. The initial short-circuit current ($I_{sc}$) of the cell during discharging was measured and found to be 92 mA/cm$^2$. The open-circuit voltage at this time was 1.36 V. At a fixed current of 2 mA, the cell was discharged to a final voltage of 0.9 V and then charged to a final voltage of 1.5 V. This charging-discharging test was repeated. Even after 600 cycles, the test proceeded without an appreciable change in energy efficiency and current efficiency. The electrical capacity after 600 cycles was 86% based on the initial capacity. This shows that the cell is substantially on a practical level as a secondary cell.

For comparison, a cell was built by the same procedure as above except that a positive electrode material not containing Ketjen Black KB-EC was used. The cell was evaluated under the same conditions as above. At the time of discharging, the initial short-circuit current ($I_{sc}$) of this cell was found to be 9 mA/cm$^2$, and at this time, its open-circuit voltage was 1.34 V. The cell was subjected to the charging-discharging test. After discharging, an attempt was made to charge the cell. But the voltage rose remarkably and the cell could not be charged.

EXAMPLE 11

Sixty milligrams of Ketjen Black KB-EC (a trademark of AKZO Chemie) was added to, and well dispersed in, a tetrahydrofuran solution containing 300 mg of poly-2-vinylpyridine (average molecular weight 80,000). The dispersion was coated on a carbon fiber disc (E-715 made by Kureha Chemical Industry Co., Ltd.) having a diameter of 4.5 cm, and tetrahydrofuran was removed by spontaneous evaporation. The disc was immersed in an acetone solution of iodine to effect addition of 430 mg of iodine, and the product was used as a positive electrode. A 0.3 mm-thick zinc plate (made by Mitsui Mining & Smelting Co., Ltd.) was used as a negative electrode. A 1 mole/liter aqueous solution of $NH_4Cl$ was used as an electrolyte solution and 2 ml of it was impregnated into two glass fiber filters. A Selemion CMV membrane made by Asahi Glass Co., Ltd. was interposed as a separator between the two glass fiber filters. The assembly was put between the two electrodes to construct a cell. The structure of the cell was that shown in FIG. 1 as in Example 1.

The following experiment was conducted at 25° C. in a stream of nitrogen. The initial short-circuit current ($I_{sc}$) of the cell during discharging was measured and found to be 95 $mA/cm^2$. The open-circuit voltage at this time was 1.36 V. At a fixed current of 2 mA, the cell was discharged to a final voltage of 0.9 V and then charged to a final voltage of 1.5 V. This charging-discharging test was repeated. Even after 600 cycles, the test proceeded without an appreciable change in energy efficiency and current efficiency. The electrical capacity after 600 cycles was 88% based on the initial capacity. This shows that the cell is substantially on a practical level as a secondary cell.

For comparison, a cell was built by the same procedure as above except that a positive electrode material not containing Ketjen Black KB-EC was used. The cell was evaluated under the same conditions as above. At the time of discharging, the initial short-circuit current ($I_{sc}$) of this cell was found to be 10 $mA/cm^2$, and at this time, its open-circuit voltage was 1.34 V. The cell was subjected to the charging-discharging test. After discharging, an attempt was made to charge the cell. But the voltage rose remarkably and the cell could not be charged.

EXAMPLE 12

Four hundred milligrams of nylon-6 (made by Toray, Inc.) containing 20% by weight of Ketjen Black was coated on a carbon fiber disc (E-715 made by Kureha Chemical Industry Co., Ltd.). The disc was immersed in an acetone solution of iodine to effect addition of 460 mg of iodine, and the product was used as a positive electrode 10. A 0.3 mm-thick zinc plate (made by Mitsui Mining & Smelting Co., Ltd.) was used as a negative electrode. A 1 mole/liter aqueous solution of $NH_4Cl$ was used as an electrolyte solution, and 2 ml of it was impregnated into two glass fiber filters. Various cation exchange membranes were each interposed as a separator between the glass fiber filters. Using the resulting assembly, a rubber packing and supports, a cell was built in the structure shown in FIG. 1.

A storage test on this cell was carried out at 25° C., and the relation between the time elapsed and the electromotive force (open-circuit voltage) was measured. The results are shown in Table 1.

For comparison, the experiment was carried out without using the separator and also by using a PVA-type separator of Kuraray Co., Ltd. (Vinylon BHN). The results are also shown in Table 1.

TABLE 1

| Type of the separator | Number of days elapsed | Electromotive force* (V) |
|---|---|---|
| None | 2 | 0.9 |
| PVA separator | 4 | 0.95 |
| CM made by Toyo Kagaku Sangyo K.K. | 31 | 1.15 |
| Nafion 324 | 240 | 1.22 |
| Selemion CMV | 300 | 1.25 |

*The initial value of the electromotive force was 1.32–1.35 V.

It is clear from Table 1 that when no separator was used, the electromotive force abruptly decreased to 0.9 V from 1.32–1.35 V in only two days, and that when the PVA separator was used, there was a little improvement over the above case, but after 10 days, the electromotive force decreased to 0.5 V and the cell was not practical.

It is seen from Table 1, on the other hand, that when Selemion cation exchange membrane (made by Asahi Glass Co., Ltd.) was used as the separator, the electromotive force hardly decreased even after the lapse of 300 days and the service life of the cell was greatly prolonged.

EXAMPLE 13

Ketjen Black was mixed with U-Loid #320, the initial-stage reaction product of a urea resin, (made by Mitsui Toatsu Chemicals, Inc.) so that the amount of the carbon became 15% by weight. One drop of 12N hydrochloric acid was added as a curing agent to 500 mg of the resulting mixture and they were fully kneaded. The mixture was coated on a carbon fiber disc (E-715 made by Kureha Chemical Industry Co., Ltd.) and cured. The disc was then immersed in an acetone solution of iodine to effect addition of 150 mg of iodine. A 0.3 mm-thick zinc plate (made by Mitsui Mining & Smelting Co., Ltd.) was used as a negative electrode. A 1 mole/liter aqueous solution of $NH_4Cl$ was used as an electrolyte solution and 2 ml of it was impregnated into two glass fiber filters. Various cation exchange membranes were each interposed between the two glass fiber filters. The assembly was put between the two electrodes to build a cell. The structure of the cell was shown in FIG. 1 as in Example 1.

A storage test on the cell was carried out at 25° C., and the relation between the time elapsed and the electromotive force (open-circuit voltage) was measured. The results are shown in Table 2.

For comparison, the test was conducted without using a separator and also by using a PVA-type separator made by Kuraray Co., Ltd. (Vinylon BHN). The results are also shown in Table 2.

TABLE 2

| Type of the separator | Number of days elapsed | Electromotive force* (V) |
|---|---|---|
| None | 2 | 0.82 |
| PVA separator | 4 | 0.80 |
| CM made by Toyo Kagaku Sangyo K.K. | 31 | 1.13 |
| Nafion 324 | 240 | 1.20 |
| Selemion CMV | 300 | 1.26 |

*The initial value of the electromotive force was 1.31–1.35 V.

It is clear from Table 2 that when no separator was used, the electromotive force abruptly decreased to 0.82 V from 1.31–1.35 V in only two days and decreased to 0.30 V in five days, and that when the PVA separator was used, there was a little improvement over the above case, but after 10 days, the electromotive force decreased to 0.4 V and the cell was not practical.

It is seen from Table 2, on the other hand, that when Selemion cation exchange membrane (made by Asahi Glass Co., Ltd.) was used as the separator, the electromotive force hardly decreased even after the lapse of 300 days and the service life of the cell was greatly prolonged.

EXAMPLE 14

The iodine/zinc cell (containing Selemion cation exchange membrane) obtained by the method of Example 12 was subjected to charging and discharging at a fixed current of 1 mA. One cycle of the charging-discharging test consisted of 5 hours of discharging and 5 hours of charging. Even in the 300th cycle, the characteristics of the cell were not lost and variations in its electromotive force were constant. This characteristic shows that the cell had superior properties as a chargeable and dischargeable secondary cell, i.e. storage cell.

[UTILIZATION IN INDUSTRY]

The cell of this invention has a high output and a low internal resistance. Even when discharging proceeds and most of iodine fixed to the positive electrode material was liberated, the electrical conductivity hardly decreased. Hence, the cell is characterized by the fact that the charging operation could be easily carried out.

The cell characteristics are not lost even upon repeated charging and discharging through many cycles (for example, 300 cycles), and the electromotive force hardly decreases even after the lapse of a long period of time (for example, 300 days). The service life of the cell becomes strikingly long.

The cell of this invention can be used as a primary cell, and preferably as a secondary cell. It can be used conveniently as a back-up power supply or emergency power supply for VTR, communication devices, portable electronic calculators, watches, computers and office automation devices (such as word processors) and also as solar cells and cells for solar systems.

We claim:

1. Secondary cell comprising a negative electrode, a positive electrode, an electrolyte solution and a cation exchange membrane between said electrodes; said positive electrode comprising a positive electrode material of a complex adduct of iodine and a polymer or a composition comprising said polymer and iodine dispersed in said polymer, said positive electrode material having a carbon dispersed therein.

2. The cell as claimed in claim 1 wherein the polymer is selected from the group consisting of polyamide, poly(meth)acrylamide, polyurethane, polyvinyl alochol and polyether.

3. The cell as claimed in claim 1 wherein the carbon is selected from the group consisting of carbon black, acetylene black and graphite.

4. The cell as claimed in claim 2 wherein the carbon is in an easily dispersible form.

5. The cell as claimed in claim 4 wherein the carbon is in the form of a powder, scales or short fibers.

6. The cell as claimed in claim 3 wherein the carbon is included in an amount of 1 to 60 percent by weight based on the weight of polymer and carbon.

7. The cell as claimed in claim 1 wherein a metal selected from the group consisting of lithium, zinc, cadmium, magnesium and aluminum is used as a negative electrode.

8. The cell as claimed in claim 1 wherein the electrolyte solution is a solution of an electrolyte selected from the group consisting of ammonium chloride, sodium chloride, zinc chloride, sodium bromide, potassium bromide, zinc iodide and lithium iodide.

9. The cell as claimed in claim 1 wherein the electrolyte solution is impregnated in a porous support.

* * * * *

UNITED STATES PATENT AND TRADEMARK OFFICE
CERTIFICATE OF CORRECTION

PATENT NO. : 4,656,105
DATED : April 7, 1987
INVENTOR(S) : Sadao Kabayashi et al It is certified that error appears in the above-identified patent and that said Letters Patent is hereby corrected as shown below:

On the title page assignee should read

--(73) Assignee: Mitsui Toatsu Chemicals, Inc. --.

Signed and Sealed this

Eighteenth Day of August, 1987

Attest:

DONALD J. QUIGG

Attesting Officer

Commissioner of Patents and Trademarks